United States Patent [19]

Tse

[11] 4,139,347
[45] Feb. 13, 1979

[54] METHOD FOR COOLING MOLTEN SULPHUR

[75] Inventor: Samuel Y. Tse, Calgary, Canada

[73] Assignee: Procor Limited, Oakville, Canada

[21] Appl. No.: 756,302

[22] Filed: Jan. 3, 1977

[51] Int. Cl.² .......................... B01J 1/00; F28F 13/00
[52] U.S. Cl. ..................................... 23/293 S; 165/1;
165/30; 165/108; 165/DIG. 1
[58] Field of Search ........... 23/293 S; 165/1, DIG. 1,
165/122, 108, 30; 302/66

[56] References Cited

U.S. PATENT DOCUMENTS

| | | | |
|---|---|---|---|
| 2,632,691 | 3/1953 | Blanchet | 23/293 S X |
| 2,767,060 | 10/1956 | Sloan, Jr. | 23/293 S X |
| 3,832,145 | 8/1974 | Ellithorpe et al. | 23/293 S |
| 3,833,056 | 9/1974 | McMinn et al. | 165/30 X |

FOREIGN PATENT DOCUMENTS 902400  8/1962  United Kingdom ...................... 165/122

OTHER PUBLICATIONS

Foust et al., "Principles of Unit Operations," John Wiley & Sons Inc., 1960, pp. 223-227.

Primary Examiner—Barry S. Richman
Assistant Examiner—Arnold Turk
Attorney, Agent, or Firm—Charles M. Kaplan; Joel E. Siegel

[57] ABSTRACT

Molten sulphur is cooled to as low as 5° F above its solidification temperature without being in direct contact with the heat exchange liquid. Such liquid is recirculated and is initially cooled to a first temperature below the solidification temperature of the molten sulphur and then heated to a predetermined second temperature which is also below such solidification temperature.

4 Claims, 5 Drawing Figures

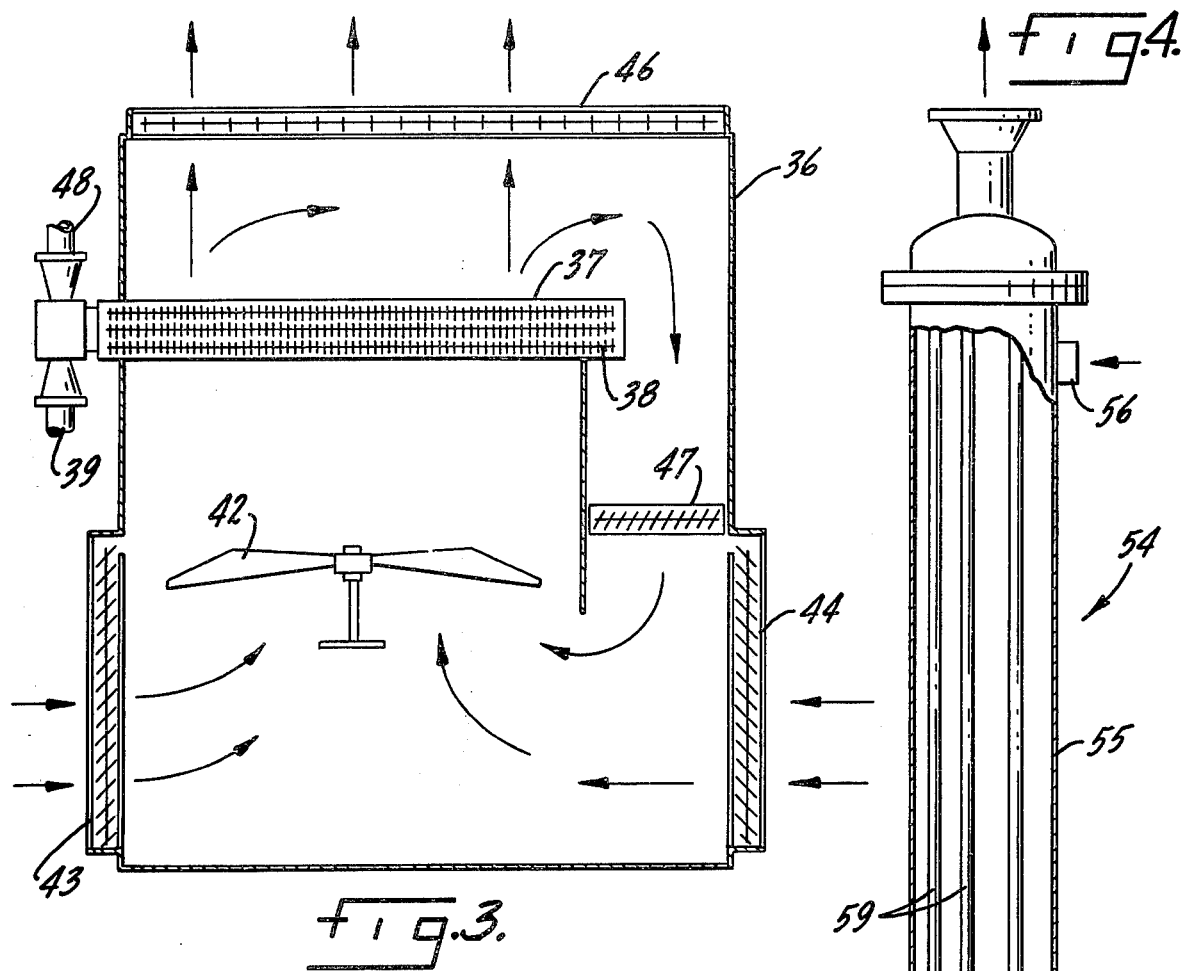
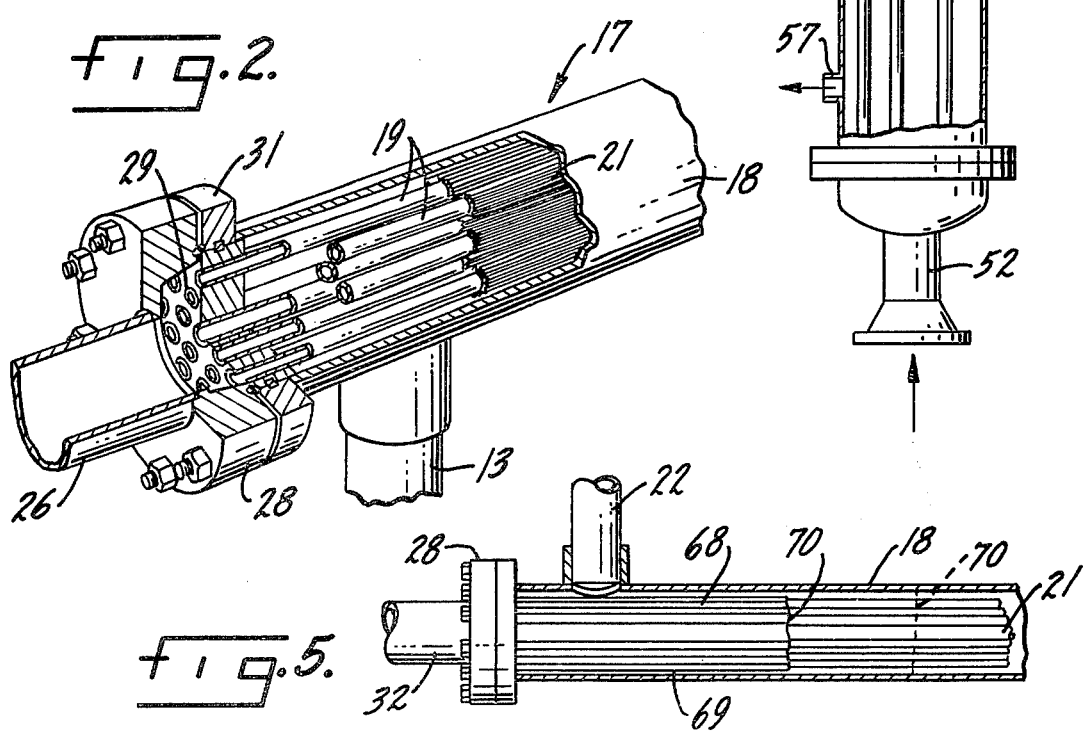

METHOD FOR COOLING MOLTEN SULPHUR

BACKGROUND OF THE INVENTION

Sulphur can be solidified into easily handled slates by pouring molten sulphur on to an endless belt that travels in a generally horizontal direction. The belt speed and length, and the thickness of the layer of liquid sulphur are coordinated such that ambient air and water cools the sulphur to below its solidification point (245° F.) before the sulphur reaches the end of the belt. The solidified sulphur fractures and falls off the end of the belt. Apparatus of this general type is disclosed in U.S. Pat. No. 3,832,145, which is assigned to the same assignee as this invention.

Molten elemental sulphur recovered by the treatment of hydrogen sulphide bearing natural and industrial gases or by the Frasch process ordinarily has a temperature in the range of 300° F. To reduce the heat transfer load on the belt-type slating installations, it is desirable to reduce the temperature of the molten sulphur to close to its solidification point before pouring it on to the belt. In the past, it has not been practical to attempt to cool sulphur to within less than 15° F. above its solidification point. The reason is that prior art sulphur cooling equipment employed ambient air as the cooling fluid, and the heat absorbing ability of such air varies substantially as its temperature and relative humidity vary. To minimize the possibility of a sharp increase in the cooling capacity of the ambient air plugging a system by solidifying the sulphur, these systems are designed to cool the sulphur to not less than 15° F. above its solidification point. Blowing air into hot molten sulphur in metal equipment also accelerates corrosion, and can increase pollution, and fire, explosion and other safety hazards.

SUMMARY OF THE INVENTION

Accordingly, it is an object of this invention to provide improved methods for cooling molten sulphur.

Another object is to cool molten sulphur to within about 15° F. above its solidification point.

Another object is to reduce pollution, fire and explosion hazards during the cooling of molten sulphur.

Another object is to prevent the solidification of molten sulphur from plugging cooling equipment.

Another object is to keep the heat transfer fluid employed out of direct contact with molten sulphur.

Another object is to provide methods for cooling molten sulphur to close to its solidification temperature that are relatively low cost, corrosion free, durable, and easy to adjust and maintain.

Another object is to provide for the cooling of molten sulphur without excessive energy consumption.

Another object is to employ the insulating properties of solid sulphur to regulate heat transfer.

Another object is to improve molten sulphur cooling methods so as to eliminate defects found in prior art systems.

Other objects and advantages of the invention will be found in the specification and claims, and the scope of the invention will be set forth in the claims.

Briefly stated, according to one aspect of the invention, a coolant liquid is handled and manipulated through several steps, rather than hot liquid sulphur which merely flows through a controlled environment where it is cooled to a relatively low temperature. Unlike molten sulphur, the coolant liquid can easily handle the heat rejection problems because the coolant is relatively unreactive, has better transport and heat transfer properties, and does not solidify in the range of operating temperatures it must endure.

DESCRIPTION OF THE DRAWING

FIG. 2 is a perspective, partially broken-away representation of a heat-exchanger for cooling molten sulphur.

FIG. 3 is a cross sectional, side elevational, schematic representation of an air cooled heat exchanger for liquid coolant.

FIG. 4 is a partially broken-away, side elevational view of a heater for liquid coolant.

FIG. 5 is a partially cross-sectional side elevational view of a portion of a heat exchanger at its outlet end.

DESCRIPTION OF THE INVENTION

Figure 1:
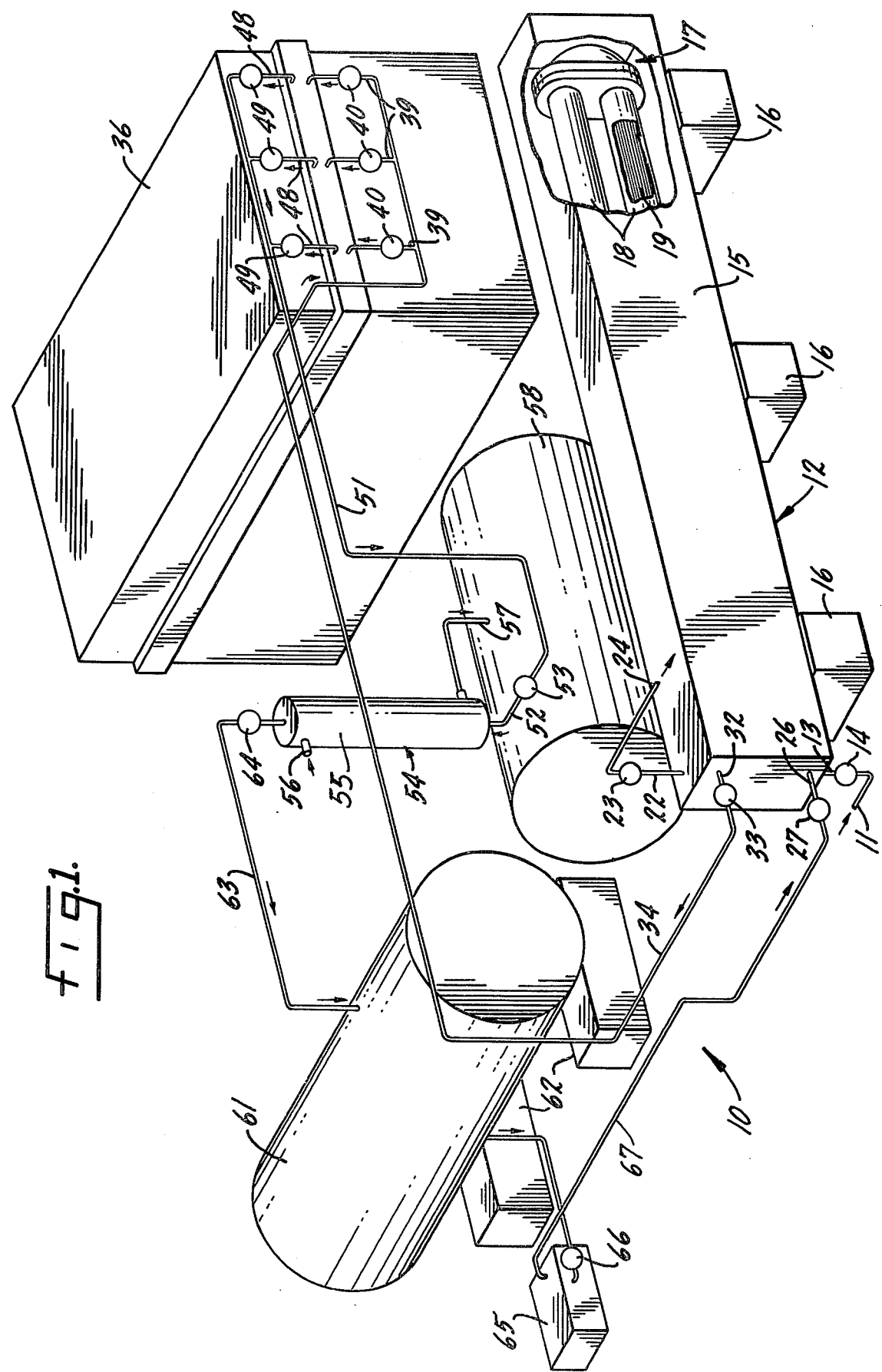
FIG. 1 is a perspective, schematic, partially broken-away representation of a sulphur cooling installation in accord with this invention.

FIG. 1 shows a system 10 for lowering the temperature of molten sulphur before such sulphur is solidified by pouring it on to a moving belt, as disclosed in the aforementioned U.S. patent. Liquid sulphur at a temperature of about 300° F. is pumped from feed pipe 11 into heat exchange means 12 through inlet pipe 13, which is regulated by valve means 14. Heat exchange means 12 has an insulating housing 15 resting on support means 16 and encloses a tube and shell hairpin heat exchanger 17, several of which may be connected in series and/or in parallel. Each heat exchanger 17 has an outer cylindrical shell 18 surrounding heat exchange conduit means, such as a plurality of multi-finned tubes 19. The specific structural details and arrangement of exchangers 17 are conventional and are not considered a part of this invention.

Molten sulphur flows from inlet pipe 13 into shell 18 where it flows over and contacts the outside of tubes 19 and their fins 21. After being cooled to within about 5° F. of its solidification point (e.g., to about 245°–250° F.), the molten sulphur leaves heat exchange means 12 through an outlet pipe 22 controlled by valve means 23. A discharge pipe 24 carries the cooled liquid sulphur to a storage reservoir or to means for feeding the sulphur on to a travelling endless belt where it solidifies into slates for further handling and transportation.

Molten sulphur flowing through shells 18 is cooled by a heat transfer fluid that flows through the inside of tubes 19. Preferably the heat transfer fluid is a liquid with excellent heat transfer properties, such as water mixed with 50% by volume of an ethylene glycol solution (e.g. Thermofluid 17 from Union Carbide Corp.). Such a liquid coolant enters heat exchanger 12 through a pipe 26 controlled by valve means 27. Pipe 26 is connected to a header 28 at an end of shell 18, and the liquid coolant enters the ends 29 of tubes 19 which terminate in a tube sheet 31. The coolant liquid enters tubes 19 at a predetermined first or heat transfer temperature (e.g., 200°–230° F.) and is pumped under pressure to flow in the same direction as the sulphur flows on the outside of tubes 19. Coolant liquid leaves heat exchanger 12 through pipe 32 controlled by valve means 33 and flows through a transfer line 34 to a finned-tube heat exchanger 36 cooled by forced ambient air. Liquid coolant enters a series of banks 37 of finned tubes 38 through pipes 39 controlled by valve means 40. Fan means 42 draws ambient air through louvers 43 and 44 and forces such air through banks 37 where the temperature of the liquid coolant is lowered to a second predetermined temperature (e.g. 195°–225° F.) that is below the solidification point of the sulphur. After passing through banks 37, the air either leaves through louvers 46, or is recirculated through louvers 47. Conventional control means are employed to adjust or shut louvers 43, 44, 46 and 47 depending on the heat load on exchanger 36 and the ambient air conditions.

Coolant liquid leaves exchanger 36 through pipes 48 controlled by valve means 49, and flows through transfer line 51 to the inlet pipe 52, controlled by valve means 53, of at least one tube and shell coolant trim heater 54. Pressurized steam (e.g., at 75 p.s.i.g.) from any suitable source enters the shell 55 of heater 54 through an inlet pipe 56 and exits through an outlet pipe 57 into a condensate storage tank 58. Coolant liquid is pumped through a plurality of finned tubes 59, which may be essentially the same as tubes 19. The liquid is heated to an accurately controlled predetermined first heat transfer temperature (e.g., 200°–230° F.) that is also below the solidification point of the sulphur. An insulated storage tank 61 resting on supports 62 receives the liquid coolant through a transfer line 63 controlled by valve means 64. Pump means 64 controlled by valve means 66 withdraws liquid coolant from tank 61 and completes the closed circuit by pumping it through line 67 into inlet pipe 26.

Adjustment of the speed of fan 42, the position of louvers 43, 44, 46 and 47, and the flow of steam through shell 55 permits accurate control of the temperature at which liquid coolant enters heat exchange means 12. This enables the sulphur to be discharged from pipes 24 at a constant temperature (e.g., 250° F.) very close to its solidification point. Operating experience has shown that the molten sulphur discharge temperature will only vary within a very narrow range even though the volume of sulphur passing through the system varies widely. Heat transfer within shell and tube exchanger 17 is self-regulating because at some location adjacent outlet pipe 22, the sulphur in direct contact with pipes 19 and fins 21 is believed to fall to its solidification point and to freeze as a thin coating 68 on the final portion 69 of exchanger 17. Since solid sulphur is an excellent insulator, little or no heat will be transferred to the liquid coolant in coated portion 69, and such coolant will act as a tracing agent keeping the sulphur at a constant temperature about 5° F. above its solidification point. As the heat transfer load varies, the edge 70 of coating 68 is believed to shift back and forth, as indicated in phantom in FIG. 5, because variations in the amount of cooling capacity available near the outlet end of exchanger 17 cause additional amounts of sulphur to be melted away or to become frozen at edge 70. This allows the sulphur handling capacity of an installation to vary widely (e.g., from 100–200 long tons per hour) without requiring complicated controls or constant adjustment in fan speed, louver position or steam pressure.

It has thus been shown that by the practice of this invention the temperature of molten sulphur can be reduced to just above its solidification point in a relatively simple system that employs the insulating properties of solidified sulphur itself to control heat transfer. Experience has shown that over 90% of the slates solidified from sulphur feed on to a travelling belt at the low temperatures attainable as described herein are of rhombic (as opposed to monoclinic) crystalline structure; this is a superior and stronger allotropic form of sulphur for transportation and handling purposes.

While the present invention has been described with reference to a particular embodiment, it is not intended to illustrate or describe herein all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

What is claimed is:

1. A method of cooling molten sulphur to a temperature above its solidification point, comprising the steps of:
    (a) flowing said molten sulphur over the outside of heat exchanger conduit means;
    (b) flowing a heat exchange liquid having a first temperatue below said solidification point through the inside of said heat exchanger conduit means in the same direction as said molten sulfur flow;
    (c) preventing said liquid and said molten sulphur from contacting each other;
    (d) maintaining said liquid and said molten sulphur in heat exchange relationship for a sufficient length of time to lower the temperature of said molten sulphur to within about 5°–15° F. above said solidification point;
    (e) recovering said molten sulphur and said liquid from said heat exchanger as separate liquids;
    (f) cooling said heat exchange liquid to a second temperature that is lower than said first temperature below said solidification point;
    (g) then heating said liquid to said first temperature below said solidification point; and
    (h) then recirculating said liquid at said first temperature in heat exchange relationship with said molten sulphur through said heat exchanger conduit means as set forth above.

2. A method of controlling the amount of heat removed from molten sulphur flowing through a heat exchanger so that the temperature of the molten sulphur can be lowered to within less than 15° F. above its solidification point without solidifying so much sulphur that flow through said heat exchanger is blocked, comprising the steps of:
    (a) flowing a heat exchanging fluid through the inside of a heat exchanger conduit;
    (b) flowing said molten sulphur over the outside of said conduit; and
    (c) regulating the temperature of said fluid at a level below said solidification point whereby when said fluid flows through said conduit a minor amount of said molten sulphur solidifies as an insulating coating on only a final portion of the outside of said conduit, the length of said sulphur coating being extended or being melted away as the heat transfer load on said heat exchanger varies, and said coating reducing heat transfer substantially as sulphur flows over said final portion.

3. The invention defined in claim 2, wherein said fluid and said molten sulphur flow through said heat exchanger in the same direction, and said fluid maintains said molten sulphur at essentially a constant temperature as it flows through said final portion of said conduit.

4. A method of cooling molten sulphur to a temperature above its solidification point, comprising the steps of:
(a) flowing said molten sulphur over the outside of heat exchange conduit means;
(b) flowing a liquid having a first temperature below said solidification point through the inside of said heat exchange conduit means in the same direction as said molten sulphur flow, thereby preventing said liquid and said molten sulphur from contacting each other;
(c) maintaining said liquid and said molten sulphur in heat exchange relationship until a minor amount of said molten sulphur solidifies as an insulating coating on a final portion of said conduit means, thereby substantially reducing further heat transfer as molten sulphur flows over said final portion and the temperature of said molten sulphur is lowered to within about 5°–15° F. above said solidification point;
(d) recovering said molten sulphur and said liquid from said heat exchanger as separate liquids;
(e) cooling said heat exchange liquid to a second temperature that is lower than said first temperature below said solidification point;
(f) then heating said liquid to said first temperature below said solidification point; and
(g) then recirculating said liquid at said first temperature in heat exchange relationship with said molten sulphur.

* * * * *

UNITED STATES PATENT AND TRADEMARK OFFICE
CERTIFICATE OF CORRECTION

PATENT NO. : 4,139,347
DATED : February 13, 1979
INVENTOR(S) : Samuel Y. Tse

It is certified that error appears in the above-identified patent and that said Letters Patent are hereby corrected as shown below:

In column 3, line 24 delete "Pump means 64" and insert
--Pump means 65--

Signed and Sealed this

First Day of May 1979

[SEAL]

Attest:

RUTH C. MASON
Attesting Officer

DONALD W. BANNER
Commissioner of Patents and Trademarks